US010806087B2

(12) United States Patent
Craig

(10) Patent No.: US 10,806,087 B2
(45) Date of Patent: Oct. 20, 2020

(54) FAN SUPPORT ARM

(71) Applicant: DEERE & COMPANY, Moline, IL (US)

(72) Inventor: Paul I. Craig, Thibodaux, LA (US)

(73) Assignee: DEERE & COMPANY, Moline, IL (US)

(*) Notice: Subject to any disclaimer, the term of this patent is extended or adjusted under 35 U.S.C. 154(b) by 208 days.

(21) Appl. No.: 15/984,631

(22) Filed: May 21, 2018

(65) Prior Publication Data
US 2019/0350136 A1 Nov. 21, 2019

(51) Int. Cl.
*A01F 12/44* (2006.01)
*F16M 1/04* (2006.01)
*A01D 45/10* (2006.01)

(52) U.S. Cl.
CPC ............ *A01F 12/444* (2013.01); *A01D 45/10* (2013.01); *F16M 1/04* (2013.01); *F16M 2200/06* (2013.01)

(58) Field of Classification Search
CPC ....... A01F 12/444; A01F 12/48; A01D 45/10; A01D 41/1276; F16M 1/04; F16M 2200/06; F04D 39/601; F04D 29/60; F02K 1/72; F24F 7/06
See application file for complete search history.

(56) References Cited

U.S. PATENT DOCUMENTS

| 3,788,048 | A | * | 1/1974 | Stiff | A01D 45/10 55/406 |
| 3,830,046 | A | * | 8/1974 | Rollitt | A01D 45/10 56/16.5 |
| 3,925,199 | A | * | 12/1975 | Quick | A01D 45/10 209/3 |
| 4,129,339 | A |   | 12/1978 | Quick | |
| 4,155,602 | A |   | 5/1979 | Quick | |
| 4,511,462 | A | * | 4/1985 | Folsberg | B07B 4/025 209/138 |
| 4,555,896 | A |   | 12/1985 | Stiff et al. | |
| 4,924,662 | A |   | 5/1990 | Quick | |
| 5,069,024 | A | * | 12/1991 | Riberio Pinto | A01D 45/10 56/12.8 |
| 5,092,110 | A |   | 3/1992 | Dommert et al. | |
| 6,869,356 | B2 | * | 3/2005 | Hinds | A01D 45/10 460/70 |
| 9,119,346 | B2 | * | 9/2015 | Vergote | A01D 45/10 |
| 9,456,547 | B2 | * | 10/2016 | Cazenave | A01D 45/10 |
| 10,076,076 | B2 | * | 9/2018 | Craig | A01D 45/10 |
| 10,344,993 | B2 | * | 7/2019 | Gettig | A01D 45/10 |
| 2005/0109291 | A1 | * | 5/2005 | Karanik | F01P 5/02 123/41.63 |
| 2006/0210396 | A1 | * | 9/2006 | Mead | F04D 29/601 415/213.1 |

(Continued)

FOREIGN PATENT DOCUMENTS

BR 202014025639 U2 5/2016
WO 0032026 A1 6/2000

Primary Examiner — Arpad Fabian-Kovacs
(74) Attorney, Agent, or Firm — Taft Stettinius & Hollister LLP; Stephen F. Rost

(57) ABSTRACT

A fan support arm with a base section configured to be coupled to a sidewall, a mount section configured to be coupled to a motor, and an arm section extending between the base section and the mount section. Wherein, the arm section has a profile that minimizes aerodynamic drag.

18 Claims, 6 Drawing Sheets

(56) References Cited

U.S. PATENT DOCUMENTS

| | | | |
|---|---|---|---|
| 2008/0141541 A1* | 6/2008 | Hurley | A01D 34/4163 |
| | | | 30/276 |
| 2008/0315033 A1* | 12/2008 | Diochon | B64D 27/18 |
| | | | 244/54 |
| 2010/0132326 A1* | 6/2010 | Berthet | A01D 46/285 |
| | | | 56/328.1 |
| 2015/0016965 A1* | 1/2015 | Sawyers-Abbott | F02K 1/72 |
| | | | 415/148 |
| 2017/0108000 A1* | 4/2017 | Junior | F04D 29/384 |
| 2017/0251601 A1* | 9/2017 | Dugas | A01D 41/1276 |

\* cited by examiner

FAN SUPPORT ARM

FIELD OF THE DISCLOSURE

The present disclosure relates to a support arm for a fan and more particularly to a support arm for a cleaning fan of a sugarcane harvesting machine that minimizes aerodynamic drag.

BACKGROUND

During operation of a sugarcane harvesting machine, sugarcane crop is generally cut near the soil in which it grows. As the crop is harvested, it is cut into smaller pieces referred to as cane billets. The billets can reach a rearward portion of the machine where it travels along a conveyor and is transported to a cart or wagon. Many sugarcane harvesting machines utilize an extractor to extract trash and debris from a cleaning chamber. The extractor is often a fan positioned within ductwork to pull the trash and debris from the cleaning chamber. The fan has sufficient power to draw the trash and debris through the ductwork and fan and expel the trash and debris away from the sugarcane harvesting machine.

In many sugarcane harvesting machines, the fan is coupled to a motor that is positioned in a substantially central location of the ductwork. The fan is coupled to the ductwork with one or more support arms that extend from the motor to the corresponding segment of ductwork to hold the fan and motor in proper alignment with the ductwork. Often, hydraulic or electric components are routed through one of the support arms to provide power to the motor. Further, the support arm or arms typically have a square or rectangular cross-section that creates substantial aerodynamic drag when the fan is powered. Further, the square or rectangular cross-section of the support arm is often prone to catching or otherwise restricting debris flow.

Thus, there is a need for a fan arm that minimizes aerodynamic drag while increasing debris flow therearound.

SUMMARY

One embodiment of the present disclosure has a fan support arm with a base section configured to be coupled to a sidewall, a mount section configured to be coupled to a motor, and an arm section extending between the base section and the mount section. Wherein, the arm section has a profile that minimizes aerodynamic drag.

In one example of this embodiment, the arm section defines a hollow cavity, wherein motor controls are routed through the hollow cavity.

In another example of this embodiment, the profile is a rounded teardrop shape along a profile axis. In one aspect of this example, the fan support arm is at least partially positioned about a fan rotation axis and the profile axis is angularly offset from the fan rotation axis. In another aspect of this example, the profile axis is angularly offset from the fan rotation axis by an offset angle of between about thirty-eight degrees and about forty-eight degrees. In yet another aspect of this example, the profile axis is angularly offset from the fan rotation axis by an offset angle of about forty-five degrees.

In another example of this embodiment, the fan support arm is formed from a casting process.

Another embodiment is a fan assembly for coupling a fan to a duct having a base section configured to be coupled to the duct, a fan hub configured to be coupled to a motor, and an arm section connecting the base section to the fan hub. Wherein, the arm section has a rounded leading edge.

In one example of this embodiment, the arm section is the only structure coupling the fan hub to the duct.

In another example, the fan hub defines a rotation axis therein and the arm section has a cross section that defines a profile axis, wherein the profile axis is not parallel with the rotation axis.

In yet another example of this embodiment, the base section, fan hub, and arm section are integrally formed form a single material. In one aspect of this example, the base section, fan hub, and arm section are formed with a casting process.

Another example of this embodiment has a rotation axis defined through the fan hub and a fan plane defined perpendicularly to the rotation axis, wherein the arm section has a leading surface plane that is between about thirty-one and forty-one degrees offset from the fan plane and a trailing surface plane that is between about fifty-two and sixty-two degrees offset from the fan plane. In one aspect of this example, the arm section defines a profile axis that is angularly offset from the fan plane by between about thirty-five degrees and about fifty-five degrees.

Yet another embodiment of the present disclosure is a sugarcane harvesting machine with a main frame, at least one ground-engaging mechanism for supporting the main frame, a feed mechanism configured to receive a crop and chop it into billets, a cleaning chamber having an extractor thereon, wherein the extractor further has a fan assembly for coupling a fan to a duct, the fan assembly further having a base section coupled to a portion of the duct, a fan hub coupled to a motor that drives the fan, and an arm section connecting the base section to the fan hub. Wherein, the arm section has a profile that minimizes aerodynamic drag.

In one example of this embodiment, the motor selectively powers the fan to move surrounding air in a flow direction and the arm defines an exterior surface exposed to the surrounding air, wherein the exterior surface contains only rounded edges.

In another example of this disclosure, the base section, fan hub, and arm section are integrally formed from a single material in a casting process.

In yet another example of this embodiment, the motor is a hydraulic motor and a pressurized hydraulic line and a return hydraulic line are routed through the arm section.

In another example, the arm section has a substantially rounded teardrop shaped cross-section. In one aspect of this example, the teardrop shaped cross-section is defined along a profile axis that is between about thirty-eight degrees and about forty-eight degrees angularly offset from a rotation axis.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
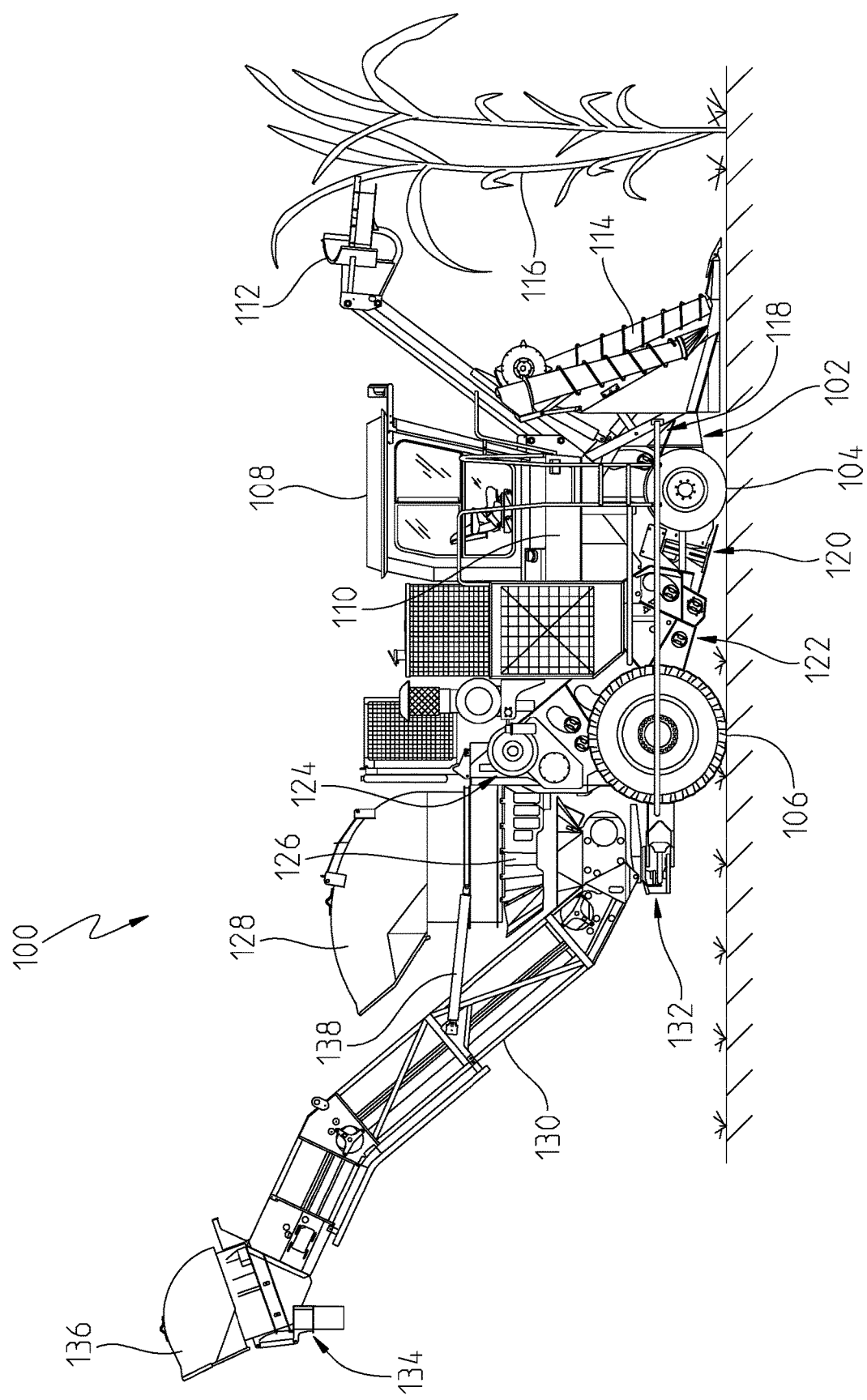
FIG. 1 is a side view of a sugarcane harvesting machine.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on track assemblies (not shown) or wheels (i.e., a front wheel 104 and a rear wheel 106), with a cab 108 adapted to house an operator. The cab 108 may include a plurality of controls for controlling the operation of the machine 100. An engine 110 or other power system may supply power for driving the machine 100 along a field and for powering various driven components of the machine. In certain embodiments, the engine 110 may directly power a hydraulic pump (not shown), and various driven components of the harvester may be powered by hydraulic motors (not shown) receiving hydraulic power from the hydraulic pump via an embedded hydraulic system (not shown).

A cane topper 112 may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles (not shown) on the base cutter assembly 120 may further direct the cut ends of the plants upwardly and rearward within the harvester 100 toward a feeding mechanism such as successive pairs of upper and lower feed rollers (not shown). The feeding mechanism may be rotatably supported by a chassis 122, and may be rotatably driven by a hydraulic motor or other device (not shown) in order to convey the stalks toward a chopper drum module 124 for chopping into relatively uniform billets.

The chopper drum module 124 may include upper and lower chopper drums which may rotate in opposite directions around, respectively, parallel axes (not shown) in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle (not shown).

The elevator or conveyor system 130 may be coupled to a swing table or pivot bearing 132, as shown in FIG. 1. As such, the entire system 130 is capable of pivoting up to or about 180° to unload the billets from either side of the machine 100.

In one aspect of this disclosure, the first extractor 128 may be located adjacent a basket. During operation, the sugarcane billets may pass through the basket and be received at a first end of a conveyor. The first extractor 128 may include a suction blower or other similar apparatus for drawing debris (i.e., leaves) and other impurities from the sugarcane billets that are received by the inclined conveyor.

Figure 2:
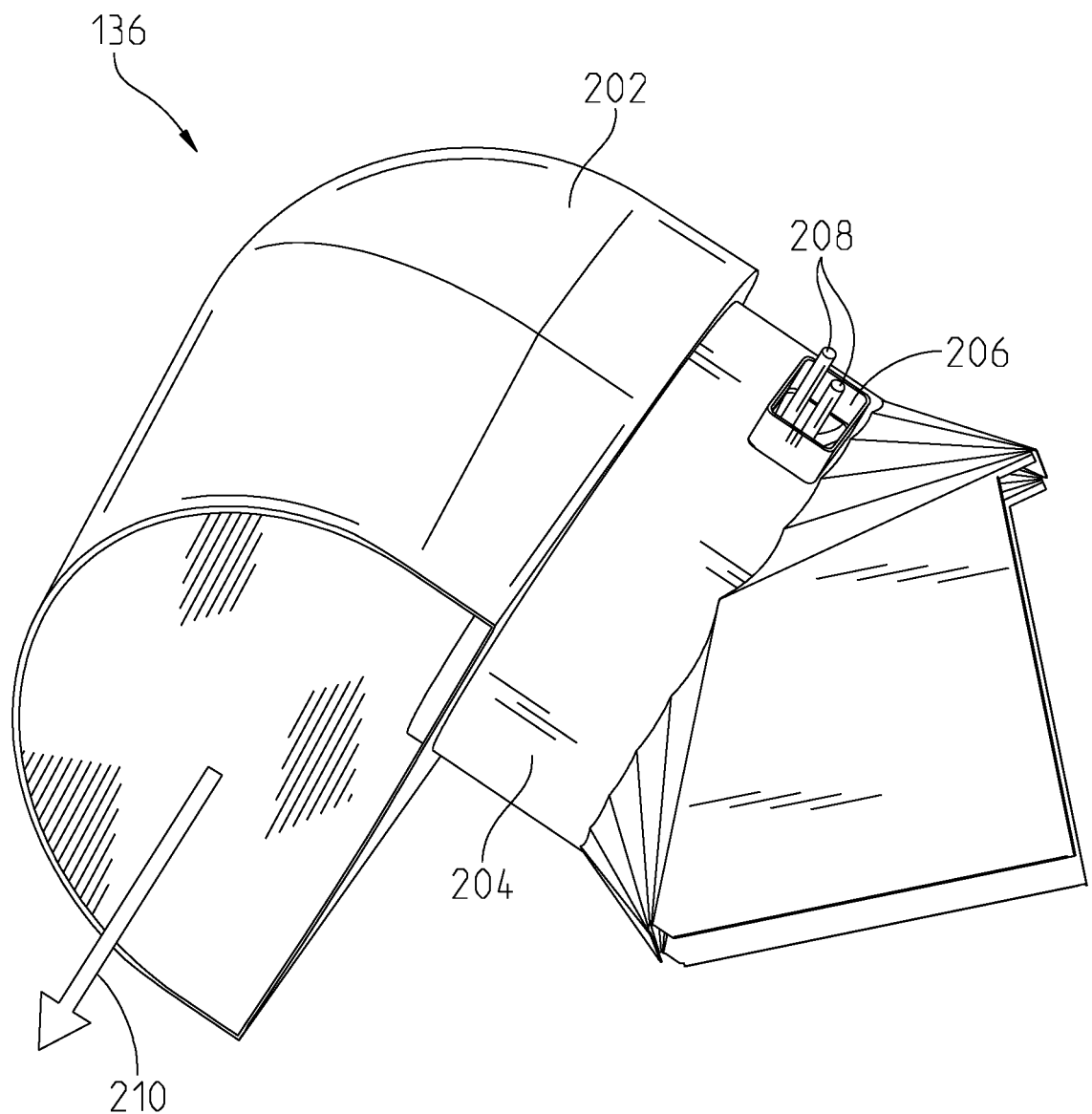
FIG. 2 is an isolated perspective view of an extractor assembly separated from the harvesting machine of FIG. 1.
Figure 3:
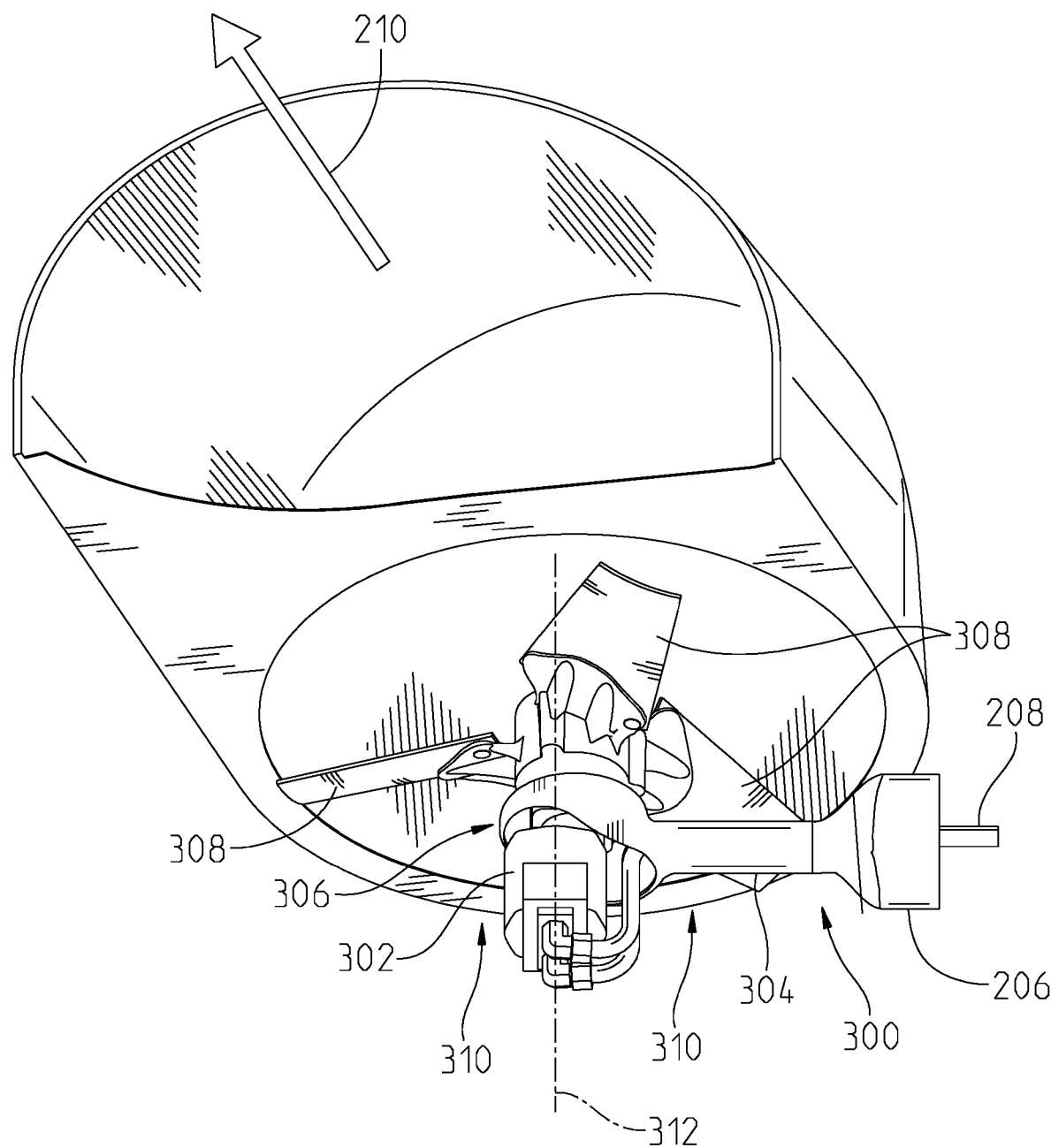
FIG. 3 is a different perspective view of the extractor of FIG. 2 with a duct removed.

Referring now to FIGS. 2 and 3, the secondary extractor 136 is shown isolated from the machine 100. The secondary extractor 136 may have a hood 202 coupled to a duct 204 with a support arm assembly 300 positioned therein. The hood 202 and duct 204 may be shaped to direct trash and debris away from the formed billets and out an exhaust direction 210. The duct 204 may have defined therethrough a coupling through hole that corresponds with a support base 206 of the support arm assembly 300. The coupling through hole may provide a location to removably couple the support base 206 to the duct 204 and further allow motor control or engagement lines 208 to provide hydraulic, pneumatic, or electric power to a fan motor 302 positioned within the duct 204.

The support arm assembly 300 may have a support arm 304 coupled to the support base 206 on one end and a motor hub 306 on the other. The support base 206 may also provide for a location to removably couple the motor 302 to the duct 204 with the support arm 304. More specifically, the support base 206 may be welded, bolted, or otherwise fastened to the duct 204 to provide a structural coupling location for the support arm 304. In this configuration, the support arm 304 may be coupled to the support base 206 on one end, and to the motor hub 306 on the other. The motor hub 306 may be sized to provide a coupling surface for the motor 302. Accordingly, the motor 302 may be coupled to the motor hub 306, which is coupled to the duct 204 through the support arm 304 at the support base 206.

The motor 302 may also have a shaft that extends through the motor hub 306 that is coupled to fan blades 308. In one aspect of this disclosure, the duct 204 may define a substantially circular cross-section and the motor 302 may be positioned at a substantially central location within the duct 204. In this configuration, the fan blades 308 extend radially away from the shaft and terminate at a location adjacent an inner wall of the duct 204. Accordingly, as the motor 302 rotates the fan blades 308, air is drawn generally from a surrounding area 310 by the fan blades 308 and forced out the exhaust direction 210 with the hood 202. The air may be drawn from the surrounding area 310 and moved in a helical path along a rotation axis 312 of the fan blades 308. In this orientation, the motor 302 may rotate the fan blades 308 about the rotation axis 312 to draw air and debris into the hood 202 from the surrounding area 310. Further, the air and debris may then be directed out of the hood 202 in the exhaust direction 210.

The motor 302 may be any type of motor known in the art for providing a rotational movement to a fan blade. More specifically, the motor 302 may be a hydraulic motor and the engagement lines 208 may be hydraulic fluid supply and return lines. Alternatively, the motor 302 may be an electric motor and the engagement lines 208 may be positively and negatively charged electrical lines. In yet another embodiment, the motor 302 is a pneumatic motor and the engagement lines 208 may have a pressurized pneumatic line therein. Accordingly, this disclosure considers many different types of motors 302 for powering a fan blade, and the embodiment shown herein is only meant as one non-exclusive example.

Figure 4:
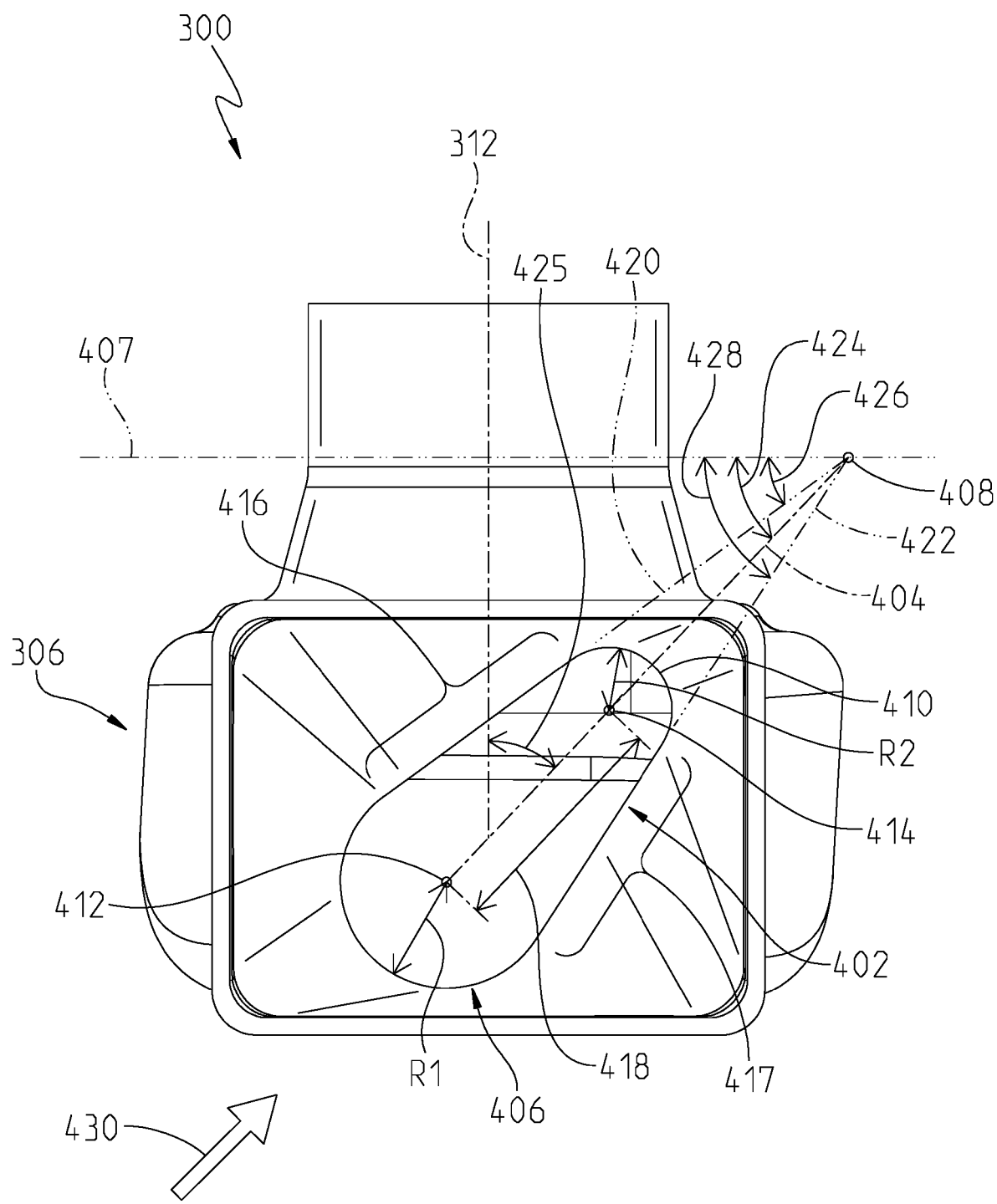
FIG. 4 is a side view of a support arm assembly from the extractor assembly of FIG. 2.

Referring now to FIG. 4, a side profile 402 of the support arm assembly 300 is illustrated with a substantially rounded leading edge 406 and a substantially rounded trailing edge 410. The rounded leading edge 406 may be defined about a first axis 412 and the rounded trailing edge 410 may be defined about a second axis 414. Further, the side profile 402 may have a substantially linear first and second side section 416, 417 that connect the leading and trailing edges 406, 410 to one another.

The leading edge 406 of the side profile 402 may be defined by an arc that is slightly greater than one-hundred and eighty degrees about the first axis 412. The arc may terminate at the linear side sections 416, 417 as they extend tangentially away from the leading edge 406 and towards the trailing edge 410. The trailing edge 410 may be defined by an arc that is slightly less than one-hundred and eighty degrees about the second axis 414. The side sections 416, 417 may similarly align tangentially with the arc of the trailing edge 410 to provide a substantially continuous perimeter of the side profile 402.

In one aspect of this disclosure, the arc defining the leading edge 406 may have a first radius R1 and the arc defining the trailing edge 410 may have a second radius R2. The second radius R2 is less than the first radius R1. More specifically, in one non-limiting example the second radius R2 may be between about 50% and 70% the first radius R1. Further still, the second radius R2 may be between about 55% and 65% the first radius R1. In yet another non-limiting example, the second radius R2 may be about 60% the first radius. In this orientation, the side profile 402 has a rounded raindrop-like perimeter.

Similarly, the first axis 412 may be spaced from the second axis 414 by an axis distance 418. The axis distance 418 may be the linear distance from the first axis 412 to the second axis 414 and may be defined along a profile axis 404 that extends through the first and second axes 412, 414 to a fan plane 407. In one non-exclusive example, the axis distance 418 may be between about twice the first radius R1 and two and one-half times the first radius R1. Further still, in another example the axis distance 418 may be about two and one-quarter times longer than the first radius R1.

In one non-exclusive example, the first radius R1 may be between about twenty-five millimeters and about forty millimeters. In another example, the first radius R1 may be between about thirty-two millimeters and about thirty-five millimeters. Further still, in another example the first radius R1 is about thirty-four millimeters. While specific measurements and ratios are described herein for the first radius R1, the second radius R2, and the axis distance 418, these measurements and relationships are meant as non-exclusive examples, and others are contemplated as part of the teachings of this disclosure.

In one aspect of the present disclosure, the profile axis 404 is angularly offset from the rotation axis 312. More specifically, the fan plane 407 may be defined perpendicular to the rotation axis 312 and positioned along a profile intersect 408 of the profile axis 404. The fan plane 407 is used herein as a reference to establish an angular orientation of the profile axis 404, a first side axis 420, and a second side axis 422.

Further, the fan plane 407 may be substantially perpendicular to the view illustrated in FIG. 4. Accordingly, the illustrated fan plane 407 appears as a line in FIG. 4 and the relative angles referred to herein are defined in a plane perpendicular to the fan plane 407 at a location along the support arm 304 as illustrated in FIG. 4.

In one aspect of this disclosure, the first side axis 420 may be aligned with the first side section 416 and extend to the intersect 408. Similarly, the second side axis 422 may be aligned with the second side section 417 and extend to the intersect 408. Accordingly, the profile intersect 408 may be the location that the fan plane 407, the profile axis 404, and the first and second side axis 420, 422 all intersect one another.

In one non-exclusive example, the profiles axis 404 may be offset from the fan plane 407 by a profile angle 424. The profile angle 424 may be any angle that corresponds with the side profile 402 to limit any resistance applied to material moving in a path of travel 430. In one example of this disclosure, the profile angle 424 may be between about thirty-six degrees and fifty-six degrees relative to the fan plane 407. In this orientation, as the fan blades 308 move air and debris from the surrounding area 310, the fan blades 308 may also move the surrounding air and debris in a helical pattern as they rotate about the rotation axis 312. As the fan blades 308 rotate and agitate the surrounding air and debris, the specific path of travel 430 may become angularly offset from the rotation axis 312 in a helical pattern about the rotation axis 312. Further, the profile axis 404 may be substantially aligned with the path of travel 430 under ideal fan speeds and conditions.

In another non-exclusive example, the orientation of the profile axis 404 may be identified with reference to the rotation axis 312 directly. More specifically, an offset angle 425 may be the angle of the profile axis 404 relative to the rotation axis 312 as identified in the side view of FIG. 4. The offset angle 425 may be between about thirty-four degrees and fifty-four degrees relative to the rotation axis 312. In yet another embodiment, the offset angle 425 may be about forty-five degrees. However, this disclosure also considers an offset angle 425 that is any angle that allows the profile axis 404 to be aligned with the path of travel 430 in an orientation that reduces aerodynamic drag caused by the support arm assembly 300.

By substantially aligning the profile axis 404 with the path of travel 430, the impact of the support arm assembly 300 on the air and debris being processed through the extractor 136 may be minimized. More specifically, the leading edge 406 may be the only portion of the support arm assembly 300 that restricts surrounding air and debris from movement in the path of travel 430. Further, the sides 416, 417 and trailing edge 410 may combine with the leading edge 406 to form a rounded teardrop-like side profile 402 angled to align the leading edge 406 with the path of travel 430.

More specifically, the first side axis 420 may extend along the first side 416 and through the profile intersect 408 to define a first side angle 426 relative to the fan plane 407. The first side angle 426 may be angularly offset from the fan plane 407 by an angle that is less than the profile angle 424 but greater than zero degrees. In one non-exclusive example, the first side angle 426 may be between about twenty-six degrees and about forty-six degrees relative to the fan plane 407. In another non-exclusive example, the first side angle 426 may be between about thirty-one degrees and about forty-one degrees. In yet another example, the first side angle 426 may be about thirty-six degrees.

Similarly, the second side axis 422 may extend along the second side 417 and through the profile intersect 408 to define a second side angle 428 relative to the fan plane 407. The second side angle 428 may be angularly offset from the fan plane 407 by an angle that is greater than the profile angle 424. In one non-exclusive example, the second side angle 428 may be between about forty-seven degrees and about sixty-seven degrees relative to the fan plane 407. In another non-exclusive example, the second side angle 428 may be between about fifty-two degrees and about sixty-two degrees. In yet another example, the second side angle 428 may be about fifty-seven degrees.

In one aspect of this disclosure, the sides 416, 417 may taper inwardly along the path of travel 430 as described above. By tapering inwardly, the aerodynamic drag generated by the support arm 304 may be substantially reduced compared to an arm with a square cross-section or the like. Reducing the aerodynamic drag of the support arm 304 may allow for more efficient removal of debris from the extractor. More specifically, reducing the aerodynamic drag caused by the support arm 304 allows the motor 302 and fan blades 308 to move air and debris at a desired rate while reducing the amount of power consumed by the motor 302. In other words, reducing the aerodynamic drag caused by the support arm 304 in the extractor results, in part, in a more efficient sugarcane harvesting machine 100 because the power consumed by the motor 302 is more efficiently applied to moving air and debris through the extractor.

Figure 5:
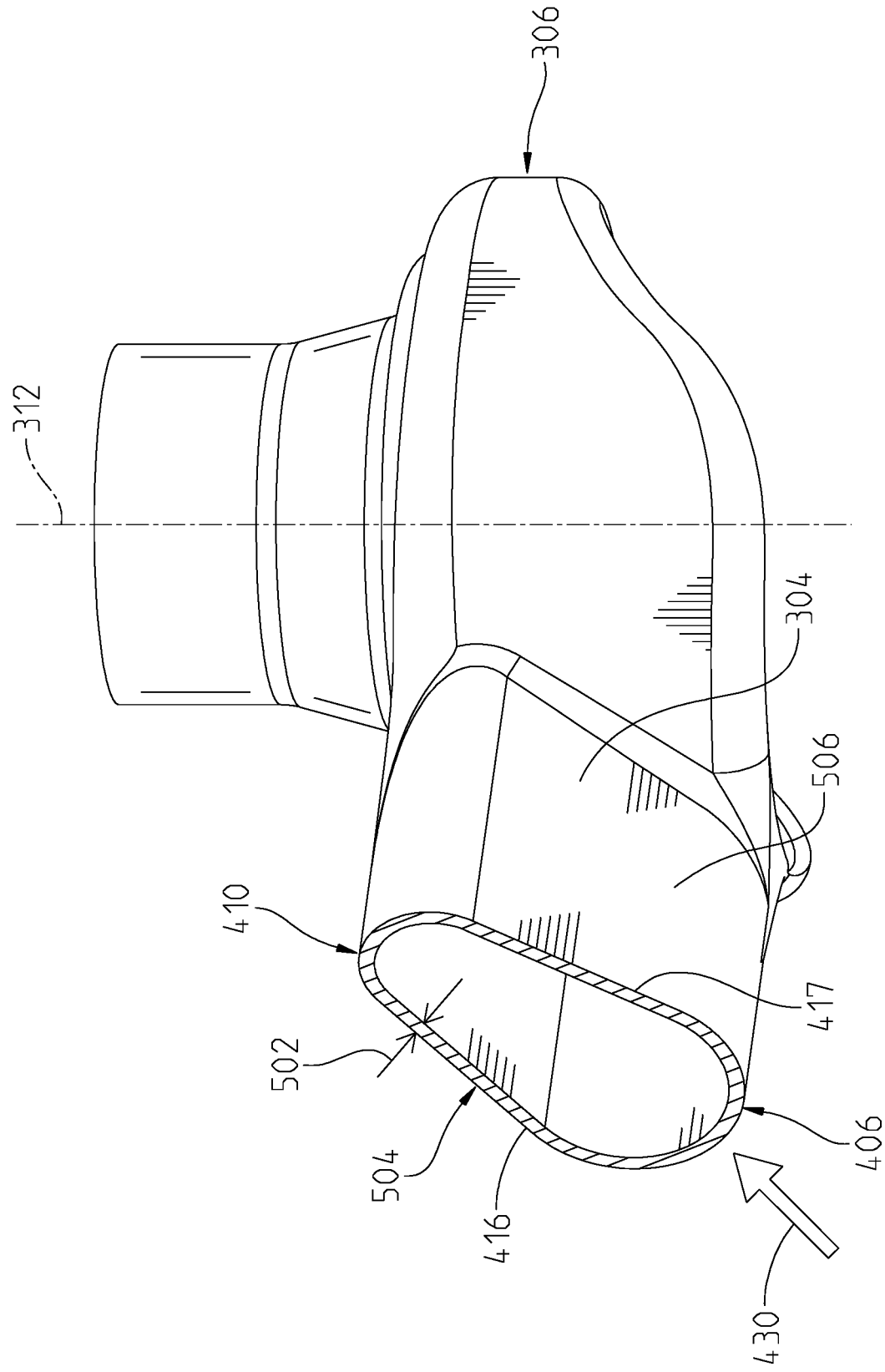
FIG. 5 is a cross-sectional perspective view of a portion of the support arm assembly from FIG. 4.

Referring now to FIG. 5 a perspective section view of the support arm assembly 300 is shown. More clearly shown in FIG. 5 is the leading edge 406 coupled to the trailing edge 410 with the sides 416, 417. The leading edge 406, trailing edge 410, and sides 416, 417 may be integrally formed from substantially the same material. Further, the leading edge 406, trailing edge 410, and sides 416, 417, all have a thickness 502. The thickness 502 may be substantially the same throughout the support arm 304 or it may vary between the leading edge 406, trailing edge 410, and sides 416, 417. As one non-exclusive example, the thickness 502 may be greater at the leading edge 406 than the thickness 502 at the trailing edge 410 or vice versa. Similarly, the thickness 502 may be greater at the portion of the support arm 304 biased towards the support base 206 than the portion of the support arm 304 biased towards the motor hub 306. Accordingly, many different thickness 502 configurations are considered herein.

In one aspect of this disclosure, the support arm 304 may be formed from a casting process or the like. In this embodiment, a form or mold may be utilized to define the leading edge 406, trailing edge 410, and sides 416, 417 at the desired thickness 502. Further, the mold may define the sides 416, 417 to be substantially planar portions of the support arm 304. More specifically, the first side 416 may define a trailing surface plane 504 and the second side 417 may define a leading surface plane 506. The mold may form the leading edge 406, trailing edge 410, trailing surface plane 504, leading surface plane 506 as part of the casting process. The casting process may include adding a molten material into the mold to form the components of the support arm assembly 300 from one integral material. Further, the casting material may be any material known in the art and this disclosure is not limited to forming the support arm assembly from any particular material.

While the secondary extractor 136 is shown and described throughout while referring to the support arm assembly 300, the teachings of this disclosure are equally applicable to the primary extractor 128 as well and this disclosure is not meant to be limited to the secondary extractor. Accordingly, the above descriptions and figures with reference to the support arm assembly 300 of the secondary extractor 136 are hereby incorporated herein for the primary extractor 128 as well. Further, the teachings of this disclosure may apply to any fan support arm and this disclosure considers the application of these teachings that are not specifically related to extractors of a sugarcane harvesting machine.

Figure 6:
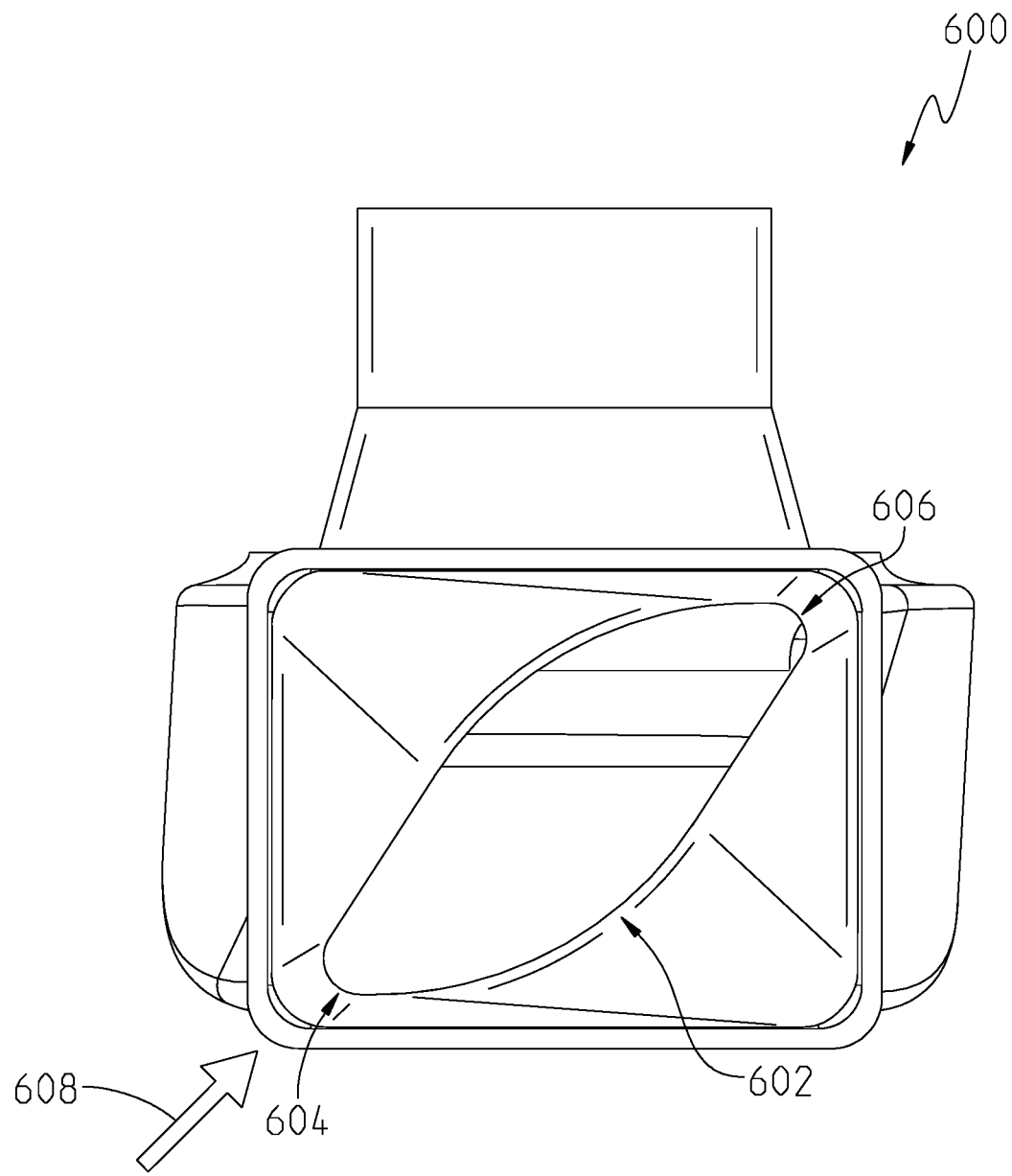
FIG. 6 is another embodiment of a support arm assembly.

Referring now to FIG. 6, another non-exclusive example of a support arm assembly 600 is illustrated. The support arm assembly 600 may be similar to the support arm assembly 300 illustrated and described above with the exception of having a rounded profile 602. The rounded profile 602 may have a reduced aerodynamic drag similar to the side profile 402. The rounded profile 602 may have on outer profile with substantially curved surfaces that extend from a leading edge 604 to a trailing edge 606 along a flow path 608. The rounded profile 602 may reduce aerodynamic drag and thereby increase how efficiently the corresponding extractor moves air and debris therethrough.

In one non-exclusive example of this disclosure, implementing the support arm assembly 300 shown and described herein may substantially reduce the power requirements of the motor 302 compared to a conventional support arm with a substantially square cross-section. More specifically, the rounded tear-drop shaped side profile 402 may reduce power consumption of the motor by about 17% compared to the conventional support arm while processing the same amount of air and debris through the extractor. As explained above, the reduction in power consumption is greatly attributable to the reduction in aerodynamic drag generated by the side profile 402 compared to the conventional support arm. In short, the rounded tear-drop side profile 402 allows air and debris to more easily flow through the extractor, thereby reducing the amount of power required by the motor 302 to generate the appropriate airflow through the extractor.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A fan support arm assembly, comprising:
   a base section coupled to a sidewall;
   a mount section coupled to a motor having a fan to rotate the fan about a rotation axis; and
   an arm section extending from the mount section radially away from the rotation axis to the base section;
   wherein, the arm section has a profile oriented along a profile axis that minimizes aerodynamic drag, the profile axis being angularly offset from the rotation axis.

2. The fan support arm assembly of claim 1, further wherein the arm section defines a hollow cavity, wherein motor controls are routed through the hollow cavity.

3. The fan support arm assembly of claim 1, further wherein the profile is a rounded teardrop shape having a rounded leading edge defined about a first axis and a rounded trailing edge defined about a second axis, wherein the profile axis is defined through the first and second axis.

4. The fan support arm assembly of claim 1, wherein the profile axis is angularly offset from the fan rotation axis by an offset angle of between about thirty-eight degrees and about forty-eight degrees.

5. The fan support arm assembly of claim 1, wherein the profile axis is angularly offset from the fan rotation axis by an offset angle of about forty-five degrees.

6. The fan support arm assembly of claim 1, wherein the fan support arm is a cast material.

7. A fan arm assembly for coupling a fan to a duct, comprising:
a base section coupled to the duct;
a fan hub coupled to a motor; and
an arm section extending radially inwardly from the duct towards a rotation axis and connecting the base section to the fan hub;
wherein, the arm section has a rounded leading edge and a rounded trailing edge oriented along a profile axis that is angularly offset from the rotation axis.

8. The fan assembly of claim 7, further wherein the arm section is the only structure coupling the fan hub to the duct.

9. The fan assembly of claim 7, further wherein the profile axis is not parallel with the rotation axis.

10. The fan assembly of claim 7, wherein the base section, fan hub, and arm section comprise a single material.

11. The fan assembly of claim 7, further wherein the rotation axis is defined through the fan hub and a fan plane is defined perpendicularly to the rotation axis, wherein the arm section has a trailing surface plane that is between about thirty-one and about forty-one degrees offset from the fan plane and a leading surface plane that is between about fifty-two and about sixty-two degrees offset from the fan plane.

12. The fan assembly of claim 11, further wherein the profile axis is angularly offset from the fan plane by between about thirty-five degrees and about fifty-five degrees.

13. A sugarcane harvesting machine, comprising:
a main frame;
at least one ground-engaging mechanism for supporting the main frame;
a feed mechanism configured to receive a crop and chop it into billets;
a cleaning chamber having an extractor thereon, wherein the extractor further comprises a fan assembly for coupling a fan to a duct, the fan assembly comprising:
a base section coupled to a portion of the duct;
a fan hub coupled to a motor that drives the fan; and
an arm section extending radially inwardly from the base section towards a rotation axis and connecting the base section to the fan hub;
wherein, the arm section has a profile oriented along a profile axis that minimizes aerodynamic drag and that is angularly offset from the rotation axis.

14. The sugarcane harvesting machine of claim 13, further wherein the motor selectively powers the fan to move surrounding air in a path of travel and the arm defines an exterior surface exposed to the surrounding air, wherein the exterior surface contains only rounded edges.

15. The sugarcane harvesting machine of claim 13, further wherein the base section, fan hub, and arm comprise a single material.

16. The sugarcane harvesting machine of claim 13, further wherein the motor is a hydraulic motor and a pressurized hydraulic line and a return hydraulic line are routed through the arm section.

17. The sugarcane harvesting machine of claim 13, further wherein the arm section has a substantially rounded teardrop shaped cross-section.

18. The sugarcane harvesting machine of claim 17, further wherein the teardrop shaped cross-section is defined along the profile axis that is between about thirty-eight degrees and about forty-eight degrees angularly offset from a rotation axis.

\* \* \* \* \*